United States Patent [19]

Eyngorn

[11] Patent Number: 4,862,613

[45] Date of Patent: Sep. 5, 1989

[54] LIGHTED SIGN

[76] Inventor: Jacob Eyngorn, 111 Devonshire Cir., Penfield, N.Y. 14526

[21] Appl. No.: 135,920

[22] Filed: Dec. 21, 1987

[51] Int. Cl.[4] ............................................. G09F 13/18
[52] U.S. Cl. ......................................... 40/546; 40/576
[58] Field of Search .......................... 40/546, 547, 576

[56]  References Cited

U.S. PATENT DOCUMENTS

| | | | |
|---|---|---|---|
| 2,196,105 | 4/1940 | Cunningham | 40/546 |
| 2,443,561 | 6/1948 | Greenwald | 40/546 |
| 2,499,063 | 2/1950 | Hammer | 40/546 |
| 2,548,126 | 4/1951 | Sholkin | 40/546 |
| 2,640,144 | 5/1953 | Levy | 40/546 |
| 4,555,694 | 11/1985 | Yanagishima et al. | 40/546 |

Primary Examiner—Gene Mancene
Assistant Examiner—Michael Lynch
Attorney, Agent, or Firm—Howard Greenwald

[57] ABSTRACT

An edge-lighted neon sign, which is comprised of a one-piece slab of light-transmitting material having spaced, substantially parallel faces and comprising a front parallel face and a back parallel face, wherein integrally connected to the back parallel face are at least two horizontally-extending light-transmitting channels which are comprised of transparent, light-transmitting material.

A first horizontally-extending channel is disposed on an edge of said back parallel face of the slab of light-transmitting material and a second horizontally-extending channel is disposed on an edge of the back parallel face of the slab of light-transmitting material which is opposite the edge on which the first horizontally-extending channel is disposed.

The sign of this invention is also comprised of at least two neon lamps, wherein at least one of the lamps is so disposed that it is substantially contiguous with an edge of the second horizontally-extending channel.

16 Claims, 1 Drawing Sheet

U.S. Patent     Sep. 5, 1989     4,862,613
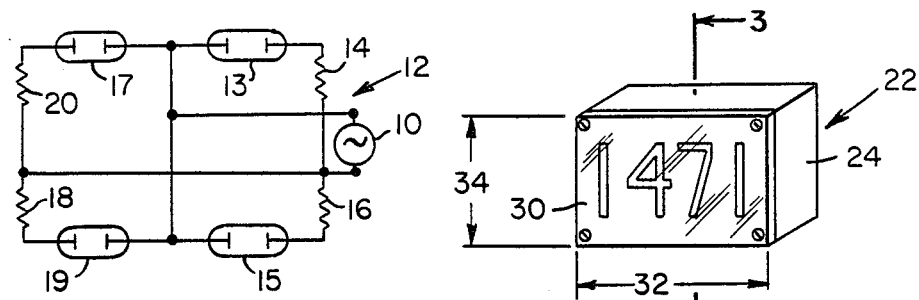
FIG. 1
FIG. 2
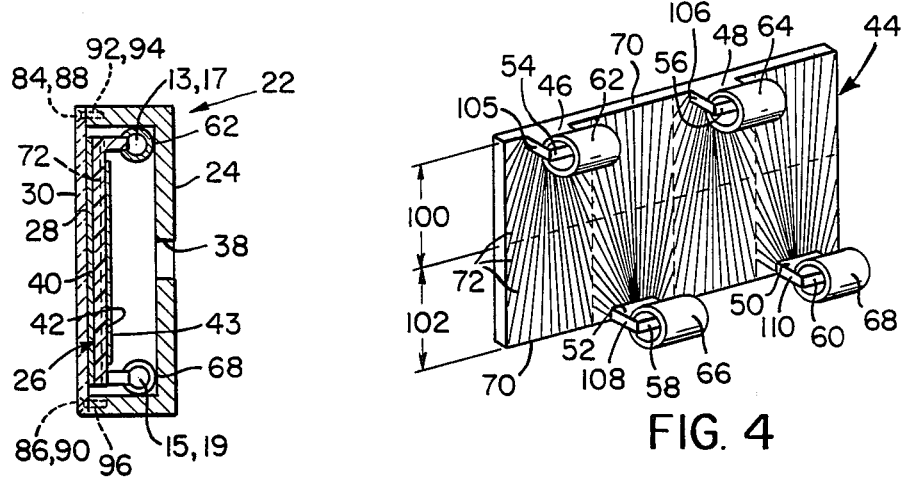
FIG. 3
FIG. 4
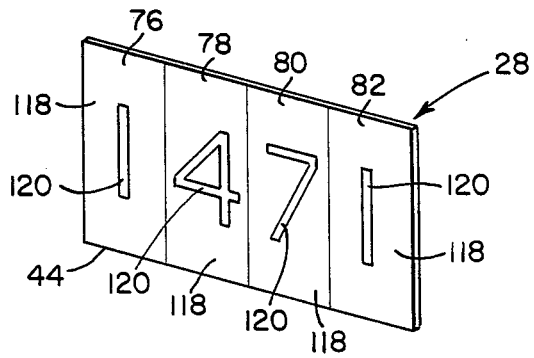
FIG. 5

LIGHTED SIGN

TECHNICAL FIELD

An edge-lighted sign comprised of a one-piece slab of transparent, light-transmitting material, at least two neon lamps, and from 1 to 5 numerals and/or letters.

BACKGROUND OF THE INVENTION

Edge-lighted signs are well known to those skilled in the art. Thus, U.S. Pat. No. 3,349,511 discloses an illuminated sign comprised of a sheet of glass or plastic in which a light source is positioned at the edge of the sheet in order to direct light longitudinally throughout the sheet. The patentee teaches that "in the prior art, longitudinally lighted devices use the effect and construction known as edge lighting. In this construction, a transparent sheet of rigid material such as glass or plastic is illuminated by means of lamps or the like at points around the periphery of the transparent sheet. The light from the light source is transmitted longitudinally, i.e., planar to the major surfaces of the sheet. The lighted displays in the prior art are not efficient in utilizing the light longitudinally transmitted through the sheet and such inefficiency results in a display of non-uniform reflection, low contrast, and derivatively poor visibility."

Many of the prior art illuminated signs utilize a substantial amount of electricity during operation and, thus, must incorporate expensive circuitry to shut them off in the daytime. Thus, for example, U.S. Pat. No. 3,406,475 discloses a rectangular, illuminated sign comprised of a lamp which is connected in an electric circuit connected by a light-sensitive cell for breaking the circuit during the daytime. Thus, for example, U.S. Pat. No. 4,386,476 discloses an edge-lighted display sign which comprises a variable duty cycle oscillator to control the lamp in the sign.

U.S. Pat. No. 3,179,902 discloses an edge-lighted sign which can be allowed to remain continuously on and is powered from an a.c. source. However, the apparatus of this patent must comprise a transformer located within the apparatus to step down the voltage to the incandescent lamps used in the sign.

It is an object of this invention to provide an edge-lighted sign with excellent visibility during both the daytime and nightime.

It is another object of this invention to provide an edge-lighted sign which can be allowed to stay on all the time but which consumes only a minimal amount of electrical power.

It is yet another object of this invention to provide an edge-lighted sign which has a simple, inexpensive design and need not comprise a transformer, a light-operated on-off switch, or other complex components.

SUMMARY OF THE INVENTION

In accordance with this invention, there is provided an edge-lighted neon sign. The sign of this invention is comprised of a one-piece slab of light-transmitting material having spaced, substantially parallel faces and comprising a front parallel face and a back parallel face, wherein integrally connected to said back parallel face are at least two horizontally-extending light-transmitting channels which are comprised of transparent, light-transmitting material, and wherein:

1. each of said horizontally-extending channels forms an angle of from about 15 to about 165 degrees with said back parallel face,
2. each of said horizontally-extending channels is comprised of a front edge, a right edge, and a left edge,
3. a first horizontally-extending channel is disposed on an edge of said back parallel face of said slab of light-transmitting material selected from the group consisting of the top edge, the bottom edge, the left edge, and the right edge of said back parallel face; and,
4. a second horizontally-extending channel is disposed an edge of said back parallel face of said slab of light-transmitting material which edge is opposite the edge on which said first horizontally-extending channel is disposed.

The sign of this invention is also comprised of at least two neon lamps, each one with a nominal current of from about 0.3 to about 1.9 milliamperes and a nominal wattage of from about 0.04 to about 0.25 watts, wherein at least one of said lamps is so disposed so that it is substantially contiguous with an edge of said first horizontally-extending channel, and wherein at least one of said lamps is so disposed so that it is substantially contiguous with an edge of said second horizontally-extending channel.

Furthermore, the sign of this invention also comprises:

1. means for disposing at least two neon lamps in a manner such that each of them is substantially contiguous with one edge of a horizontally-extending channel and said second horizontally-extending channel;
2. means for supplying sufficient voltage to said neon lamps to cause them to operate at a nominal current of from about 0.3 to about 1.9 milliamperes and a nominal wattage of from about 0.04 to about 0.25 watts,
3. from about 1 to about 5 indicia, each of which is partially opaque and partially transparent, and each of which is contiguous with the front parallel face of said one-piece slab of light-transmitting material;
4. a cover plate which is disposed in front of each of said indicia; and a journal box in which said neon lamps, one-piece slab, indicia, and cover plate are mounted; and,
5. means for securing said cover plate and one-piece slab to said journal box.

DESCRIPTION OF THE DRAWINGS

The present invention will be more fully understood by reference to the following detailed description thereof, when read in conjunction with the attached drawings, wherein like reference numerals refer to like elements, and wherein:

FIG. 1 is a schematic of a preferred lighting circuit which can be used in the apparatus of this invention;

FIG. 2 is a perspective view of an edge-lighting apparatus of this invention;

FIG. 3 is a cross-sectional view of the apparatus of this invention;

FIG. 4 is a perspective view of one preferred reflecting panel which can be used in the apparatus of this invention;

FIG. 5 is a front view of indicia which can be used in the apparatus of this invention.

DESCRIPTION OF THE PREFERRED EMBODIMENTS

The apparatus of this invention is comprised of a multiplicity of neon lamps. As is known to those skilled in the art, neon lamps usually consist of a pair of electrodes sealed within a bulb containing neon gas at a low pressure. A description of neon glow lamps is contained on pages 51–52 of Volume 9, McGraw-Hill Encyclopedia of Science and Technology (McGraw-Hill Book Company, New York, 1977), the disclosure of which is hereby incorporated by reference into this specification. Reference may also be had to General Electric Co., "Lamp Bulletin," Publ. No. LD-1; Illuminating Engineering Society, "IES Lighting Handbook," 4th ed., 1968; and Stanford University, "Neon Lamps as Circuit Elements," Rep. No. 10. Each of these publications is hereby incorporated by reference into this specification.

The neon lamps used in this invention are preferably operated in a circuit supplied with from about 105 to about 125 r.m.s. volts of alternating current. Alternatively, the neon lamps can be operated in a circuit supplied with from about 105 to about 125 volts of direct current. The specified amounts of both the direct current and the alternating current have the same heating effect, and either can be used. However, because of simplicity of circuit design, it is preferred to use the alternating current.

As is known to those skilled in the art, the resistance of the neon lamp decreases with increasing current. Thus, a current limiting element is used in the electric circuit to maintain a desired stabilized current in the circuit. The nominal current of the neon lamps used in this invention is from about 0.3 to about 1.9 milliamperes. The nominal wattage of the neon lamps, when used in the circuit supplied with from about 105 to about 125 r.m.s. (root mean squared) volts is from about 0.04 to about 0.25 watts.

Some suitable neon lamps which can be used in this invention are presented in Table 1.

one orifice 38 through which wires (not shown) can pass.

Reflecting panel 26 is comprised of a front side 40 and a back side 42. In one embodiment, reflective foil 43 is in the back side of the reflecting panel. Said front side 40 is substantially flat in order to mount numerals 28 thereon. Said back side 42 has horizontally-extending channels projecting therefrom, as is illustrated in more detail in FIG. 4. Furthermore, as is discussed hereinafter, said back side 42 may be coated with fluorescent paint.

FIG. 4 illustrates one preferred embodiment of reflecting panel 26 prior to the time its back side 42 is coated with fluorescent paint and covered with a light-reflective material. As can be seen by reference to FIG. 4, reflecting panel 26 is a one-piece plexiglass member comprised of substantially flat portion 44 and horizontally-extending channels 46, 48, 50, and 52. For the purpose of clarity, neon lamps are not shown in FIG. 4; and the circuit of FIG. 1, associated with said neon lamps, also is not shown. However, in this embodiment, one of these neon lamps is placed so that it is either contiguous with or near the edges 54, 56, 58, and 60 of channels 46, 48, 52, and 50 so that the light from each of said lamps is transmitted into the substantially flat portion 44 of reflecting panel 26. Thereafter, in order to maximize the amount of light which passes out of the front side 40 of the reflecting panel 26, back side 40 is coated with fluorescent paint (not shown), thereafter, the painted back side 40 is coated with a foil reflective member 43, and reflective members 62, 64, 66, and 68 are placed over the neon lamps (not shown) and over the channels 46, 48, 50, and 52. In this preferred embodiment, the reflective members 62, 64, 66, and 68 cover both the neon lamp and the entire portion of the chan-

TABLE 1

| CIRCUIT VOLTS (a.c.) | NOMINAL WATTS | NOMINAL CURRENT (milliamperes) | MAXIMUM INITAL BREAKDOWN VOLTS (a.c.) | MAXIMUM INITIAL BREAKDOWN VOLTS (d.c.) | EXTERNAL RESISTANCE (ohms) |
|---|---|---|---|---|---|
| 120 | 0.040 | 0.3 | 65 | 90 | 220,000 |
| 105–125 | 0.067 | 0.3 | 65 | 90 | 100,000 |
| 120 | 0.067 | 0.3 | 65 | 90 | 100,000 |
| 105–125 | 0.083 | 0.7 | 65 | 90 | 100,000 |
| 120 | 0.142 | 1.2 | 95 | 135 | 47,000 |
| 105–125 | 0.250 | 1.9 | 95 | 135 | 30,000 |

By way of illustration and not limitation, suitable neon lamps with properties identical to or comparable to the lamps described in Table 1 may be purchased from Simcona, 275 Mt. Read Boulevard, P.O. Box 60967, Rochester, New York 14606. Thus, e.g., one may also refer to Newark Electronics catalog 106, available from Newark Electronics, 656 Kreag Road, Pittsford, New York 14534.

A typical circuit which may be used in this invention is illustrated in FIG. 1. Referring to FIG. 1, alternating current source 10 supplies 120 volts of power to circuit 12. Ballast resistors 14, 16, 18, and 20 limit the amount of voltage supplied to the neon lamps; each of these ballast resistors is 30,000 ohms, 0.5 watts, and of carbon construction.

FIGS. 2, 3, and 4 show a preferred embodiment of the present invention. The lighting device 22 is shown in a broken-away perspective view. Said lighting device is comprised of junction box 24, reflecting panel 26, numerals 28, and cover plate 30.

In one preferred embodiment, junction box 24 has a width 32 of 9 inches, a height 34 of 4.5 inches, and a depth of 2 inches. It preferably is comprised of at least nel, including its left side, right side, top, and bottom so that light which is not initially transmitted through the edge of the channel 54 into substantially flat portion 44 of the reflecting panel 26 and out of the front side 40 of the reflecting panel will be reflected back into the channel and thence out of front side 40.

One preferred feature of reflecting panel 26, which helps transmit light from the channel to the opposite end 70 of the reflecting panel are grooves, up to about 1 m.m., 72. These grooves 72, which preferably extend up to about 1.0 millimeters into the face 42 of reflecting panel 26, are preferably not parallel to each other and, in the embodiment illustrated in FIG. 4, tend to converge from a multiplicity of points on face 42 of reflecting panel 26 towards channel 46 or 48 or 50 or 52.

After grooves 72 have been cut into the face 42 of reflecting panel 26, said face 26 is coated with fluorescent paint. Alternately, other forms of luminous paint, such as phosphorescent paint, can be used. Fluorescent and phosphorescent paint require an outside source for excitation (such as, e.g., a neon lamp). These paints may be classified as either the short-afterglow or long-afterglow varieties. The luminescent materials in the short-afterglow, or fluorescent, paints are generally organic polynuclear hydrocarbons like anthracene or chrysene, or various luminescent dyes such as rhodamine. Long-afterglow, or phosphorescent, paints generally employ either alkaline-earth sulfide type phosphors or zinc-sulfide-type phosphors.

In one preferred embodiment, the preferred luminescent paint is yellow fluorescent paint available from Plasti-Kote Co., Inc., 1000 Lake Road, Medina, Ohio 44256.

After the luminescent paint has been applied over grooves 72 and face 42, a reflective or opaque material (not shown) is used to cover the painted grooves and face 42. The reflective or opaque material may be any suitable reflective or opaque material known to those skilled in the art. Thus, by way of illustration and not limitation, materials such as aluminum foil, opaque paint, reflective paint, and the like can be used.

Numerals 28 are illustrated in FIG. 5. In the embodiment illustrated in FIG. 4, rectangular sheets of plexi-glass 76, 78, 80, and 82 are placed upon the substantially flat front side 40 of reflecting panel 26, the numerals 28/reflecting panel 26 assembly is then placed within junction box 24, the cover plate 30 (which is transparent) is placed over the front of the numerals 28/reflecting panel 26/junction box 24 assembly, and the whole assembly is then fastened together by, e.g., screws extending through orifices 84, 86, 88, and 90 of cover plate 30 into orifices 92, 94, and 96 of junction box 24 (see FIG. 2).

The aforementioned description of the embodiments illustrated in FIGS. 1 through 5 illustrate one of the preferred embodiments of this invention. As will be apparent to those skilled in the art, other embodiments are within the scope of this invention.

Reflecting panel 26 is preferably comprised of a plexi-glass or lucite material. However, any other transparent solid material can be used. Thus, by way of illustration and not limitation, one can use any clear plastic material.

Reflecting panel 26 is a one-piece light-transmitting member having first and second opposed surfaces and at least two light-transmitting channels integrally connected to said second opposed surface. This panel preferably is a slab of transparent light-transmitting plastic having spaced substantially parallel planar faces.

The first of said opposed surfaces of the reflecting panel 26 has been identified as front side 40 in FIG. 2. The second of said opposed surfaces of reflecting panel 26 has been identified as back side 42 in FIG. 2.

Four light-transmitting channels have been illustrated in Figures 3 and 4, having been identified as channels 46, 48, 50, and 52. However, there may be more light-transmitting channels, there may be fewer lighttransmitting channels, the light-transmitting channels may be in different locations than those illustrated in the Figures, and/or the light-transmitting channels may be at different angles than those illustrated in the Figures.

Referring again to FIG. 4, it is preferred that the reflecting panel 26 comprise at least two light-transmitting channels, at least one of which is disposed on the top half 100 of back side 42 of the panel, and at least one of which is disposed on the bottom half 102 of back side 42 of the panel. In one preferred embodiment, illustrated in FIGS. 3 and 4, at least two light-transmitting channels are disposed on both the top half 100 and the bottom half 102 of back side 42 of the panel 26.

In one embodiment, not shown, at least one of the light-transmitting channels is disposed on back side 42 of panel 26 and extends substantially the whole length 104 of the back side 42 of the reflecting panel. In a more preferred embodiment, at least two of the light-transmitting channels are so disposed on the back side of the panel and extend substantially the whole length 104 of the back side 42 of the panel.

The light-transmitting channels which comprise light-reflecting member 26 are integrally connected to back side 42 of the reflecting panel 26. That is, the front 40, the back 42, and each of the light-emitting channels are each part of an integral, one-piece glass structure, light-reflecting panel 26.

The light-transmitting channels illustrated in FIGS. 3 and 4 are at an angle of about 90 degrees with respect to back 42 of light-reflecting panel 26. However, they may be at one angle and others may be at another angle. What is required, however, is that each of said channels is horizontally-extending, that is, that each of said channels form an angle with the back 42 of light-reflecting panel 26 of from about 15 to about 165 degrees and, preferably, from about 30 to about 150 degrees. It is preferred that the angle formed between the channel and the back 42 be from about 45 to about 135 degrees. It is even more preferred that said angle be from about 60 to about 120 degrees. In the most preferred embodiment, said angle is from about 75 to about 105 degrees.

At least two of the neon lamps are used in the device of this invention. It is preferred to use at least three of such neon lamps in the device. It is even more preferred to use four such neon lamps. In the most preferred embodiment, at least four neon lamps are used in the device.

At least one neon lamp is disposed in the top half 100 of the back side 42 of the reflecting panel 26, and at least one neon lamp is disposed in the bottom half 102 of said back side 42. It is preferred that at least two of such neon lamps be disposed in each of said top half 100 and said bottom half 102 of back side 42. In the most preferred embodiment, each of said neon lamps is disposed so that it is substantially contiguous with one of the edges of a light-transmitting channel.

As is illustrated in Figures, each of the light-transmitting channels has a first edge 54, 56, 58, or 60. Each of the light-transmitting channels also has a second edge 104, 106, 108, or 110. Furthermore, each of the light-transmitting channels has a third edge (not shown) opposite second edge 105, 106, 108, and 110.

Each of the neon lamps is disposed on or near one of the edges of the light-transmitting channels. It is preferred that each neon lamp be disposed on or near edge 54 or edge 56 or edge 58 or edge 60 of one of the light-transmitting channels.

Each of the neon lamps is preferably disposed so that it is substantially contiguous with at least one edge of the light-transmitting channel. The term "substantially contiguous," as used in this specification, means that the lamp is either contiguous with the edge of said channel or, if not contiguous, no more than about 3 m.m. centimeters away from the edge of the channel.

The apparatus of this invention can be of any shape, although it is preferred that it be substantially rectangular. Referring again to FIG. 2, when the apparatus is substantially rectangular it is preferred that its width be from about 8 to about 12 inches and, more preferably, from about 9 to about 10 inches. It is preferred that the height of the rectangular apparatus be from about 3 to about 7 inches and, more preferably, from about 4 to about 6 inches. It is preferred that the depth of the rectangular apparatus be from about 1.5 to about 2.0 inches.

As is illustrated in FIG. 5, indicia 28 are placed on the front side 40 of reflecting panel 26. These indicia, referred to as 76, 78, 80, and 82 in FIG. 5, may be numerals, letters, or combinations thereof. It is preferred that all of the indicia be numerals. These can be from one to nine indicia placed on the front side 40 of the reflecting panel. It is preferred that there be from 1 to 5 of such indicia and, more preferably, from about 2 to about 4 of said indicia. In a more preferred embodiment, there are from 3 to 4 of said indicia.

Each of the indicia is preferably formed from a blank which is partially opaque and partially transparent. Thus, for example, in the embodiment illustrated in FIG. 5, each of said indicia 76, 78, 80, and 82 is comprised of opaque portion 118 and transparent portion 120. These indicia can be made by means well known to those skilled in the art. Thus, e.g., one may use the "silk screen" method of stencil.

In one embodiment, junction box 24 is made of thermoformed plastic and, together with cover plate 30, numerals 28, reflecting panels 26, the neon lamps, and the circuitry associated with the lamps, forms a lighted enclosure.

Reflecting panel 26, prior to the time its back side is etched and/or coated, is transparent or translucent, preferably being transparent. It may be made from glass, plexiglass, lucite, and the like. After its back side has been etched with grooves 72, coated with phosphorescent paint, and then covered with reflective material, it becomes a panel with a clear front side 40 and a generally opaque back side 42. Thus, light generated from one of the neon lamps and directed towards the edge of a light reflecting channel will tend to be confined within said channel and to travel towards and out of the front side 40 of reflecting panel 26. If it tends to go in any other direction, then the reflective material on the back of panel 26 and/or wrapped around the neon lights and/or the light reflecting channel will tend to correct its direction.

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the following claims.

I claim:

1. An edge-lighted sign, comprising:
   (a) a one-piece slab of transparent, light-transmitting material having spaced, substantially parallel faces and comprising a front parallel face and a back parallel face, wherein:
      integrally connected to said back parallel face are at least two horizontally-extending, light-transmitting channels which are comprised of transparent, lighttransmitting material, wherein:
         each of said horizontally-extending channels forms an angle of from about 15 to about 165 degrees with said back parallel face,
         each of said horizontally-extending channels is comprised of a front edge, a right edge, and a left edge,
         at least one of said horizontally-extending channels is disposed on the top half of said back parallel face, and
         at least one of said horizontally-extending channels is disposed on the bottom half of said back parallel face;
      said back parallel face of said slab of light transmitting material is comprised of a multiplicity of grooves, wherein said grooves are coated with a paint selected from the group consisting of fluorescent paint and phosphorescent paint;
   (b) at least two neon lamps, each one with a nominal current of from about 0.3 to about 1.9 milliamperes and a nominal wattage of from about 0.04 to about 0.25 watts, wherein each of said lamps is so disposed so that it is substantially contiguous with one edge of one of said horizontally-extending channels, wherein:
      at least one of said neon lamps is disposed in the top half of said back parallel face, and
      at least one of said neon lamps is disposed in the bottom half of said back parallel face;
   (c) means for disposing each of said neon lamps in a manner such that each of them is substantially contiguous with one edge of said horizontally-extending channels, at least one of said lamps is disposed in the top half of said back parallel face, and at least one of said lamps is disposed in the bottom half of said back parallel face;
   (d) means for supplying sufficient voltage to said neon lamps to cause them to operate at a nominal current of from about 0.3 to about 1.9 milliamperes and a nominal wattage of from about 0.04 to about 0.25 watts;
   (e) from about 1 to about 5 indicia, each of which is partially opaque and partially transparent, and each of which is contiguous with the front parallel face of said one-piece slab of light-transmitting transparent material;
   (f) a cover plate which is contiguous with each of said indicia;
   (g) a journal box in which said neon lamps, one-piece slab, indicia, and cover plate are mounted; and
   (h) means for securing said cover plate and one-piece slab to said journal box.

2. The edge-lighted sign as recited in claim 1, wherein at least one of said horizontally-extending, light-transmitting channels is disposed on the top edge of said back parallel face of said slab.

3. The edge-lighted sign as recited in claim 2, wherein at least one of said horizontally-extending, light-transmitting channels is disposed on the bottom edge of said back parallel face of said slab.

4. The edge-lighted sign of claim 3, in which the horizontally-extending, light-transmitting channel disposed on the top edge of said back parallel face of said slab extends substantially the whole length of the back side of said slab.

5. The edge-lighted sign of claim 4, in which the horizontally-extending, light-transmitting channel disposed on the bottom edge of said back parallel face of slab extends substantially the whole length of the back side of said slab.

6. The edge-lighted sign as recited in claim 3, wherein at least one of said neon lamps is substantially contiguous with one edge of said horizontally-extending, light-transmitting channel which is disposed at the top edge of said back parallel face of said slab.

7. The edge-lighted sign as recited in claim 6, wherein at least one of said neon lamps is substantially contiguous with one edge of said horizontally-extending, light-transmitting channel which is disposed at the bottom edge of said back parallel face of said slab.

8. The edge-lighted sign as recited in claim 7, wherein said means for supplying voltage to said neon lamps comprises a means for supplying from about 105 to 125 volts of direct current.

9. The edge-lighted sign as recited in claim 7, wherein said means for supplying voltage to said neon lamps comprises a means for supplying from about 105 to about 125 r.m.s. volts of alternating current.

10. The edge-lighted sign as recited in claim 9, wherein said paint is a phosphorescent paint comprised of a metal sulfide phosphor.

11. The edge-lighted sign as recited in claim 10, wherein said metal sulfide phosphor is selected from the group consisting of alkaline earth sulfide phosphors and zinc sulfide phosphors.

12. The edge-lighted sign as recited in claim 9, wherein said slab of transparent, light-transmitting material is comrpised of transparent, light-transmitting plastic having spaced, substantially parallel planar faces.

13. The edge lighted sign as recited in claim 12, wherein selected from the group consisitng of plexiglass and lucite.

14. The edge-lighted sign as recited in claim 13, wherein each of said horizontally-extending channels is at an angle of from about 30 to about 150 degrees with said back parallel face.

15. The edge-lighted sign as recited in claim 14, wherein said plastic is plexiglass.

16. The edge-lighted sign as recited in claim 15, wherein each of said horizontally-extending channels is at an angle of from about 60 to about 120 degrees with said back parallel face.

* * * * *